United States Patent [19]

Lehmberg

[11] Patent Number: 4,790,627
[45] Date of Patent: Dec. 13, 1988

[54] INCOHERENT LASER SYSTEM FOR PRODUCING SMOOTH AND CONTROLLABLE SPATIAL ILLUMINATION PROFILES

[75] Inventor: Robert H. Lehmberg, Alexandria, Va.

[73] Assignee: The United States of America as represented by the Secretary of the Navy, Washington, D.C.

[21] Appl. No.: 58,415

[22] Filed: Jun. 5, 1987

[51] Int. Cl.$^4$ ...................... G02B 27/42; G02B 27/46
[52] U.S. Cl. ........................... 350/162.12; 350/162.11
[58] Field of Search ....................... 350/162.11, 162.12

[56] References Cited

U.S. PATENT DOCUMENTS 4,521,075  6/1985  Obenschain et al. .......... 350/162.11

OTHER PUBLICATIONS

Skupsky et al., "Uniformity of Energy Deposition for Laser Driven Fusion", *J. Appl. Phys.* 54(7), Jul. 1983, pp. 3662–3671.

Schmitt, "Absolutely Uniform Illumination of Laser Fusion Pellets", *Appl. Phys. Lett.* 44(4), 15 Feb. 1984, pp. 399–401.

R. H. Lehmberg et al., "Use of Induced Spatial Incoherence for Uniform Illumination of Laser Fusion Targets", *Optics Communications*, vol. 46, No. 1, 1 Jun. 1983, pp. 27–31.

B. Badger et al., "Sirius-M: A Symmetric Illumination, Inertially Confined Direct Drive Materials Test Facility", Printed in *Fusion Technology Institute*, University of Wisconsin, Madison, Wisconsin, Sep. 1985, pp. IV-9 thru IV-27.

R. J. Jensen, "The KrF Laser: The Advance Toward Shorter Wavelengths", Printed in Summary of *Research for the Inertial Confinement Fusion Program at Los Alamos National Lab.*, Los Alamos, New Mexico, Mar., 1985; pp. 23–32.

R. H. Lehmberg et al., "Use of Incoherence to Produce Smooth and Controllable Beam Profiles for Laser Fusion", *Article presented at Conference on Lasers and Electro-Optics*, 9–13 Jun. 1986, San Francisco, CA, Thursday Morning, Jun. 12, 1986.

*Primary Examiner*—Bruce Y. Arnold
*Attorney, Agent, or Firm*—Thomas E. McDonnell; Andrew M. Lesniak

[57] ABSTRACT

A technique called echelon-free ISI produces smooth, controllable target beam profiles with large KrF fusion lasers. The technique projects the desired time-averaged spatial profile F(r) onto the target via a laser system, using partially coherent broadband light. The information needed to reproduce F(r) is transported through the system by a multitude of independent coherence zones, whose diameters are small compared to scalelengths of linear aberration and gain nonuniformities; as a result F(r) remains relatively insensitive to these effects. Under conditions applicable to large KrF lasers, perturbations due to linear aberration, self-focusing, gain saturation, and diffraction, will result in a small broadening and smoothing of F(r), whose functional form should be controllable to within a few percent.

15 Claims, 1 Drawing Sheet

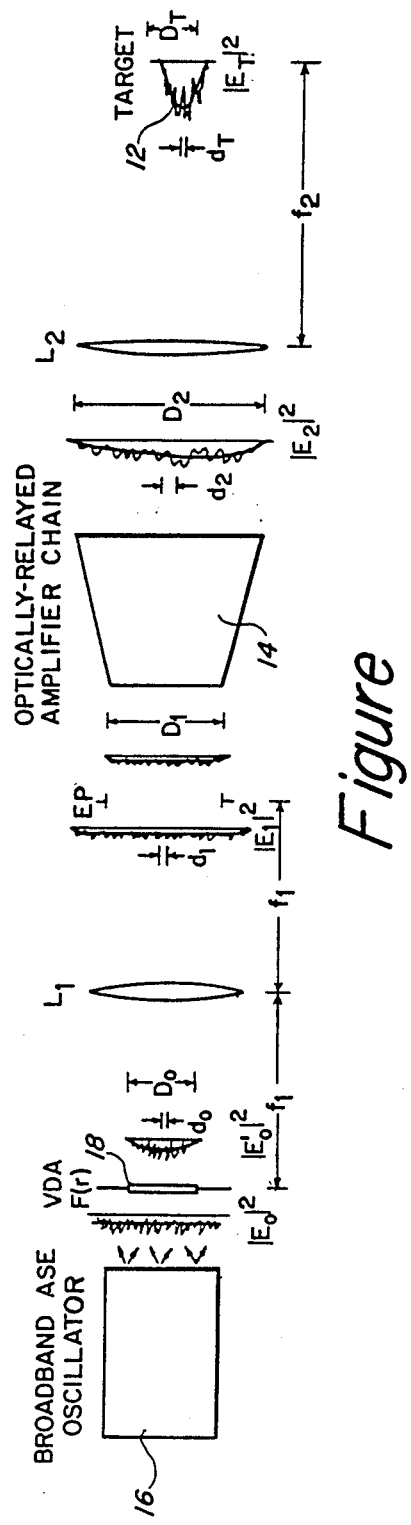
Figure 4,790,627

INCOHERENT LASER SYSTEM FOR PRODUCING SMOOTH AND CONTROLLABLE SPATIAL ILLUMINATION PROFILES

BACKGROUND OF THE INVENTION

This invention relates to laser systems and more particularly to laser systems that use the properties of incoherent light to produce a smooth and controllable spatial illumination profile at the focus of an output lens.

Direct-drive laser fusion requires concentrated laser light that uniformly illuminates a spherical target surface. Theoretical studies have shown that acceptable spherical uniformity can be achieved with direct illumination by overlapping a limited number (more than or equal to 20) of focused beams, provided that each individual beam profile is smooth and reproducible. Earlier efforts to obtain such profiles had been frustrated by the inherent imperfections in high power multistage lasers. The cumulative effect of small amplitude and phase aberrations introduced by each optical element of a multistage laser is to produce large random aberrations in the output beam. In the usual configuration, where the target is placed in the quasi near-field of the focusing lens (between the lens and its focal point), these aberrations tend to produce large random intensity nonuniformities at the target surface.

One possible solution to this problem, which is described in U.S. Pat. No. 4,521,075 to Stephen P. Obenschain and Robert H. Lehmberg, is a technique called Induced Spatial Incoherence (ISI). In this scheme, spatially incoherent light is created by propagating a laser beam of broad spectral bandwidth $\Delta\nu$ (delta nu) through a pair of echelon structures that impose a different time delay at each step. If the delay increments $\Delta t$ are chosen somewhat larger than the optical coherence time $t_c = 1/\Delta\nu$, the beam is sliced into an array of mutually-incoherent square beamlets. Each of these will independently focus to the same diffraction profile (the so-called sinc$^2$ function) of width $f\lambda/d$, provided that its initial width d is small in comparison to the transverse scalelength $s_a$ of the incident beam aberration. (Here, f is the focal length of the lens, and $\lambda$ is the mean optical wavelength.) The transient interference pattern produced by superposition of these beamlets will evolve randomly in times of order $t_c$. The target will therefore ignore this rapidly shifting structure if its hydrodynamic response time $t_h$ satisfies $t_h >> t_c$. For example, an optical bandwidth $\Delta\nu = 30$ cm$^{-1}$ (easily achieved in Nd:glass or KrF lasers) provides $t_c = 1$ psec, whereas $t_h$ is typically about 1 nsec.

In its present application, the ISI technique requires the echelons to be placed at the output of the laser. This restriction stems from self-focusing effects in glass lasers, and from the necessity of maintaining spatial coherence in the harmonic conversion crystals (used to generate the short wavelengths needed for fusion-related experiments). The beamlets would quickly and catastrophically self-focus if one attempted to amplify them in a multistage glass laser, where the nonlinear phase shifts are typically about 5-10 radians. By placing the echelons at the output, one can control self-focusing and thus maintain an acceptable degree of transverse beam uniformity over distances comparable to the beamlet width d. Unfortunately, this configuration would require an excessive number of large and expensive AR-coated steps operating at high optical fluence levels if it were used in a fusion reactor with large apertures and multiple beam lines. For example, a recent conceptual design study for the Sirius-M reactor concluded that in order to use ISI at $\lambda = \frac{1}{4}$ $\mu$m, one would require 240 steps in each transverse direction for each of 32 drive beams. Another issue raised by this ISI configuration is that of efficiency. Approximately 18% of the energy at the focal plane will diffract into sidelobes, and most of that energy would have to be discarded in order to achieve good illumination uniformity.

Although self-focusing remains a serious problem in glass lasers, it will be far less important in angularly-multiplexed KrF systems, where the amplifying medium is gaseous, and the optical intensities are typically much lower. A significant reduction of the self-focusing problem (e.g., reduction of the nonlinear phase shift to less than 1 radian) could eliminate the necessity of placing the echelons at the laser output, thereby opening the way for several possible improvements. For example, instead of the reactor configuration discussed above, one could produce the beamlets by a single pair of echelons at a low power stage, spatially-filter them to eliminate the sidelobes, then optically-relay them through each of the 32 main amplifier chains. As long as these beamlets remain small in comparison to the transverse scalelength of the aberrations (e.g., due to passive optics, turbulence, and nonuniformities in the amplifier excitation), they can focus to the sinc$^2$ profile without any sidelobes at the target.

SUMMARY OF THE INVENTION

It is therefore an object of the invention to provide an incoherent laser system for producing smooth and controllable spatial illumination profiles.

It is therefore an object of the invention to provide a KrF laser system wherein undesirable aberration effects are avoided or rendered innocuous.

It is therefore an object of this invention to obtain smooth and controllable spatial illumination profiles on targets by an incoherent light source in an inexpensive and reliable manner.

It is another object of this invention to provide an optical system that uses incoherent light to produce a smooth and controllable spatial illumination profile without requiring the use of echelon-like gratings that break a light beam into differently-delayed beamlets that overlap at a target.

The system provided by the invention is an alternative ISI scheme shown in the Figure, in which echelons are completely eliminated. The concept of the invention, echelon-free ISI, is basically an image projection technique that projects the desired spatial profile onto the target via the laser system, using partially coherent light. The information required to reproduce this profile is transported through the laser by a multitude of small coherence zones, rather than by any large whole-beam structure. Thus, the coherence zones play essentially the same role as the beamlets do in conventional ISI, except that their near-field intensity profiles are not "frozen in" by any echelon steps.

The invention provides a laser system wherein spatially-incoherent broadband light of nearly uniform time-averaged intensity $<|E_0|^2>$ and broad angular divergence $\Delta\theta_1$ travels through an optical element having an optical spatial transmission function F(r) (width $D_0$ corresponding to the smooth beam profile to be generated at the target; the resulting transmitted light of amplitude $E'_0$ whose average spatial intensity profile $<|E_0|^2>$ is proportional to F(r) travels through a lens $L_1$ producing (at the opposite focal plane) transmitted light $E_1$ characterized by average intensity $<|E_1|^2>$ and coherence zones of width $d_1$; travels through an entrance aperture EP yielding a beam of width D $d_1$; $>>d_1$; travels through an optically-relayed amplifier chain yielding a beam of width $D_2$, coherence zones of width $d_2<<D_2$, and average intensity $E_2$; travels through a lens $L_2$ producing transmitted light (on a target surface located at its focal plane) of time-average intensity $E_T^2$ proportional to F(r) whose beamwidth is $D_T$.

BRIEF DESCRIPTION OF THE DRAWINGS

The sole FIG. of the drawing is a schematic diagram of a spatially incoherent broadband laser amplifier and target illumination system.

DETAILED DESCRIPTION OF THE PREFERRED EMBODIMENT

The FIG. shows a system for achieving a very smooth and controllable spatial illumination profile F(r) on a target 12 in spite of the beam distortion that normally occurs in the high power laser amplifiers 14. The random jagged curve at target position 12 shows a typical instantaneous spatial intensity profile $|E_T|^2$ (characteristic of spatially-incoherent light) at the target plane, whereas the smooth bell-like curve shown by the heavier line is the desired time-averaged intensity profile $<|E_T|^2>\alpha$ F(r). A similar distinction between instantaneous and time-averaged profiles is indicated at other locations within the system. The incoherent light beam is generated by broadband amplified spontaneous emission (ASE) in a mirrorless or spatially-multimode laser oscillator 16, and is characterized by a nearly uniform time-averaged intensity $<|(E_0)|^2>$, broad angular divergence $\Delta\theta_0$ and small coherence width $d_0$ in its central portion. The system includes a beam-altering means 18 that converts the uniform beam to light with an average spatial intensity distribution $<|E_0'|^2>$ whose functional form F(r) is the desired target illumination profile. The means 18 may comprise a transparent film having a spatially-varying optical transmission, and is in reality a variable density absorber (VDA) whose spatial transmission function is proportional to F(r).

The system includes a first lens $L_1$ and second lens $L_2$, which project the image of the light transmitted through the means 18 onto the target surface 12. The lenses $L_1$ and $L_2$ are an essential part of the system because they perform complementary spatial Fourier transforms on the light beam.

First lens $L_1$ comprises a means for transforming this profile into a beam of specified width containing many coherent zones of small width. Second lens $L_2$ comprises a means for transforming the beam containing the coherence zones back into a beam having the desired spatial illumination profile and size.

The system includes optically relayed amplifier chain 14 located between lens $L_1$ and $L_2$ directly behind an entrance pupil EP located at the focal plane of lens $L_1$.

Operation of the above-described laser system is as follows.

The system of this invention is an alternative ISI scheme (shown in the sole FIG.), from which echelons have been completely eliminated. In the system, a large spot of spatially-incoherent broadband light is generated by amplified spontaneous emission (ASE) in a mirrorless or spatially multimode laser oscillator serving as source 16. The incoherent light from source 16 is nonuniform at any one instant, as indicated by the jagged line, but its time-averaged intensity experiences only a slow spatial variation across the oscillator aperture. By choosing the oscillator aperture sufficiently large, one can therefore achieve a nearly uniform time-averaged intensity $<|E_0|^2>$ =constant (heavy straight line) and broad angular divergence $\Delta\theta_0$ (characterized by the small coherence width $d_0=\lambda/\Delta\theta_0$) in the central portion of the spot. This central portion then traverses beam altering means 18, which is a variable density absorber (VDA), whose radial transmission function F(r) is the smooth beam profile required by target 12. The transmitted light $E_0'$ will thus exhibit an average intensity profile $<|E_0'|^2>$ proportional to F(r) of width $D_0>>d_0$, as shown by the heavy curve to the right of means 18. If means 18 is located at the focal plane of lens $L_1$, then the optical amplitude $E_1$ at the opposite focal plane to the right of $L_1$ will be the spatial Fourier transform of $E_0'$. The intensity and phase information needed to reproduce the function F(r) is therefore contained in the small coherence zones of width $d_1=f_1\lambda/D_0$, rather than the large scale beam structure of width $f_1\Delta\theta_0=f_1\lambda/d_0>>d_1$. Thus, the coherence zones play essentially the same role as the beamlets did in the original ISI scheme. At this point, the light beam is apertured to diameter $D_1\leq f_1\Delta\theta_0$ by the laser entrance pupil EP and image-relayed through the multistage amplifier chain 14 to produce the output amplitude $E_2$. The effects of aberration and beam distoration in this part of the system are illustrated in the figure by the non-symmetric appearance of the average intensity profile $<|E_2|^2>$, as shown in the heavy curve. As long as the coherence zones remain small in comparison to the apertures and transverse scalelengths $s_a$ of the aberration at each point within the laser, they will continue to accurately convey the same intensity and phase information as those at the entrance pupil EP; i.e., they will be insensitive to the large scale distortion introduced by the amplifier chain. The only change will be a transverse scaling due to the expanding apertures; i.e., $d_2/d_1=D_2/D_1$. The entrance pupil EP need not be imaged precisely onto lens $L_2$. The only requirement is that any blurring or spreading of the coherence zones due to imperfect imaging within the laser must remain small in comparison to the apertures and aberration scalelengths. Thus, if the target 12 is located at the focal plane of lens $L_2$, the output beam will focus to give an average intensity profile $<|E_T|^2>$ proportional to F(r) (heavy curve) of width $D_T=f_2\lambda/d_2$. The transient interference structure (of typical size $D_T=f_2\lambda/d_2>>d_T$) will average out over many coherence times, just as it did in the original ISI scheme.

In summary, the described system describes an alternative concept that uses a spatially-incoherent oscillator instead of echelons, and demonstrates beam smoothing in a spatially-incoherent KrF oscillator/amplifier experiment. Theory shows that our technique is applicable to large KrF fusion lasers.

A main advantage of the system is that the use of an oscillator providing spatially-incoherent light rather than coherent light allows one to eliminate entirely the echelons that were a necessary part of the prior art system shown in U.S. Pat. No. 4,521,075 where the echelons were placed at the system output because of self-focusing effects in the glass laser. Since the system is implemented with a laser (e.g. a KrF laser) having minimal self-focusing the system could, as a design choice, include echelons placed at the input, but, as indicated, the system need not include echelons, and will not include echelons (at the input) when the self-focusing is more then minimal.

The system as described has lenses $L_1$ and $L_2$; these lenses can be single or compound lenses and, obviously can include entire lens systems. The purpose of each lens or lens system is to focus the beam so that they perform complimentary Fourier function transformations as earlier described.

The invention has been practiced in a KrF laser system and can be practiced in other laser systems that have broadband capabilities and little nonlinear phase distortion. KrF laser systems are excimer lasers and are preferred over other excimer systems because they (KrF systems) have the largest bandwidth capabilities. Xenon-Chloride (XeCl), Xenon-Fluoride (XeF), Argon-Flouride (ArF) are other excimer laser systems that can be used in practicing the invention.

Obviously many modifications and variations of the present invention are possible in light of the above teachings It is therefore to be understood that within the scope of the appended claims, the invention may be practiced otherwise than as specifically described.

What is claimed and desired to be secured by letters patent of the UNITED STATES is:

1. A system for achieving a very smooth and controllable laser illumination profile on a target by transforming a uniform beam from a broadband spatially-incoherent light source into a beam of the desired profile, the system comprising:
    first means for imposing the desired spatial illumination profile on the beam beyond the source;
    second means for transforming the profile into a beam of specified width having many coherence zones of small width; and
    third means for transforming the beam containing the coherence zones back into a beam having the desired spatial illumination profile and size;
    said first, second and third means acting in concert to produce the desired beam without producing beamlets formed by echelons.

2. A method for achieving a very smooth and controllable laser illumination profile on a target by transforming a uniform beam from a broadband spatially-incoherent light source into a beam of the desired profile, the method comprising the steps of:
    first, imposing the desired spatial illumination profile on the beam beyond the source;
    second, transforming this profile beam into a beam of specified width having many coherence zones of small width; and
    third, transforming the beam containing the coherence zones into beam having a specified width;
    the aforesaid beam transformations being achieved without producing beamlets formed by echelons.

3. A system for achieving a very smooth and controllable laser illumination profile on a target, in spite of beam distortion introduced by imperfection within laser amplifiers in the system, the system comprising:
    a source of a spatially-incoherent light beam whose time-averaged intensity is spatially uniform across the beam;
    a variable density absorber for spatially modulating the light beam according to the nonuniform transmission of the absorber;
    focusing means for obtaining the spatial Fourier transform of the light beam from the absorber;
    an optically-relayed amplifier chain that amplifies the light beam from the focusing means; and
    focusing means for obtaining the Fourier transform of the light beam from the amplifier chain;
    whereby the uniform beam from the spatially-incoherent source passes, through the absorber, the amplifier chain, and both the said means to arrive at a target boundary with a smooth and controllable time-averaged intensity profile.

4. The system of claim 3 wherein said source is a broadband, amplified spontaneous emission (ASE) oscillator having an aperture sized so that a nearly uniform time-averaged intensity $<|E_0|^2>$ and broad angular divergence $\Delta\theta_0$ are achieved in a central portion of the beam.

5. The system of claim 4 wherein said variable density absorber has a radial transmission function F(r) of width $D_o$.

6. The system of claim 3 wherein the variable density absorber, focusing means, and amplifier chain are situated so that all of the optical phase and amplitude information that will be required to reproduce the illumination profile is contained in a multitude of coherence zones of width $d_1$ that remain small in comparison to the apertures and aberration scalelengths throughout the amplifier chain.

7. A method for achieving a very smooth and controllable illumination profile on a target by a beam from a broadband spatially-incoherent light source, comprising the steps of:
    generating a broadband spatially-incoherent light beam of a uniform average intensity profile, altering the spatial profile of the beam that was generated, and obtaining the spatial Fourier transform of the altered beam; and
    amplifying the beam that has been Fourier transformed, and obtaining a second spatial Fourier transform of the amplified beam;
    whereby the beam arrives at the target boundary with the desired time-averaged illumination intensity.

8. A method for achieving a very smooth and controllable illumination profile on a target by a beam that came from a broadband spatially-incoherent light source, comprising the steps of:
    generating a broadband spatially-incoherent light beam of uniform average intensity;
    altering the spatial profile of the average-intensity amplitude of the light beam by using a variable density absorber;
    obtaining the Fourier transform of the light beam from the absorber by using a focusing means;
    amplifying the light beam from the focusing means by using an optically-relayed amplifier chain; and
    obtaining the Fourier transform of the light beam from the amplifier chain by using a focusing means;
    whereby the light beam arrives at the target boundary with a smooth and controllable time-averaged intensity profile, after the beam from the spatially-incoherent source has passed through the absorber, the amplifier chain, and both focusing means.

9. A system for illuminating a target, using a broadband spatially-incoherent light source to provide illumination, comprising:
    a broadband spatially-incoherent source of a light beam of uniform average intensity across the beam;
    a variable density absorber;
    a first lens;

an optically-relayed amplifier chain having a series of apertures and having aberration characterized by a limited range of transverse scalelengths throughout the chain; and a second lens;

said beam from said source arriving at the target with a smooth and controllable average intensity spatial profile after passing through said absorber, said first lens, said amplifier chain, and said second lens in succession, (to) the coherence zones in said beam being controlled so that they remain (any blurring or spreading of the coherence zones remains) small in comparison to the apertures and the aberration scalelengths.

10. A system for converting a broadband, spatially incoherent light beam into a light beam with a controlled spatial incoherence, comprising:

a target;

optical amplifier means for illuminating said target with a light beam having a smooth and controllable spatial illumination profile;

a variable density absorber located so that said absorber superimposes a radial light transmission function F(r) upon a light beam passing through said absorber on its way to said optical amplifier means; and a broadband amplified spontaneous emission (ASE) oscillator located so that a wide beam of spatially-incoherent broadband light from said oscillator illuminates said variable density absorber to produce a transmitted beam wherein said transmitted beam travels along an optical path leading from said absorber to and through said optical amplifier means to said target.

11. A laser system for transforming an optical beam of broadband, spatially-incoherent light into a beam forming a spot of light of controlled spatial intensity profile at a spatial boundary where a target to be illuminated may, but need not, be located, the system comprising:

a source of broadband, spatially incoherent light;

a variable density absorber located where a beam of light from said source illuminates said absorber and wherein light passes through said absorber which superimposes a desired change upon said beam of light;

a lens (e.g., $L_1$) located where a beam of light from said absorber illuminates said lens and wherein light passes through said lens which Fourier transforms the light into a desired condition;

a chain of optical amplifiers located where the transformed light illuminates said amplifiers in serial fashion as they combine to introduce both angle and phase aberrations into the light beam departing from said chain of amplifiers;

a lens (e.g., $L_2$) located where a beam of light from said chain of optical amplifiers illuminates said lens and wherein light passes through said lens which Fourier transforms the light into a smooth and controllable time-averaged intensity spatial profile at the spatial boundary.

12. A system comprising:

means for generating a large spot of spatially-incoherent broadband light by amplified spontaneous emission (ASE) in a mirrorless laser oscillator, the oscillator having an aperture large enough to achieve a nearly uniform time averaged intensity $<|E_0|^2>$ and broad angular divergence $\Delta\theta_0$ in the central portion of the spot, characterized by a small coherence width;

variable density absorber means (VDA) for superimposing a radial transmission function F(r) upon said central portion of the spot so that a smooth beam profile required by a target is available after said spatially-coherent broadband light from said generating means passes through said variable density absorber means, light that has passed through this last mentioned means exhibiting an average intensity profile $<|E'_0|>$ proportional to F(r) and having width $D_0$;

lens means located in spaced relation to said variable density absorber means so that said absorber means is located at a focal point of said lens means; whereby another focal point of said lens means is the location of transmitted light having an optical amplitude $E_1$ that is the Fourier transform of $E'_0$;

aperture means located at said other focal point of said lens means for aperturing the light through a laser entrance pupil (EP);

multistage light amplifier means for relaying an image of said light to produce an output amplitude $E_2$ of light.

13. The system of claim 12 further comprising;

another lens means located in spaced relation to said amplifier means for focusing said light onto a target located at a distance of about one focal length therefrom; and target means located in spaced relation to said another lens means.

14. The system of claim 13 wherein said target means is a spherical target means illuminated in part by said beam.

15. The system of claim 24 wherein said spherical target means is a pellet of fusionable material (e.g. deuterium-tritium).

* * * * *